(12) United States Patent
Powell et al.

(10) Patent No.: US 12,095,759 B2
(45) Date of Patent: Sep. 17, 2024

(54) MITIGATION OF BRUTE FORCE ATTACK TO DEVICE PIN

(71) Applicant: ASSA ABLOY AB, Stockholm (SE)

(72) Inventors: Marc Raymond Powell, Paris (FR); François-Eric Michel Guyomarc'h, l'Herault (FR); Francois Menard, Clamart (FR)

(73) Assignee: ASSA ABLOY AB, Stockholm (SE)

( * ) Notice: Subject to any disclaimer, the term of this patent is extended or adjusted under 35 U.S.C. 154(b) by 340 days.

(21) Appl. No.: 17/454,128

(22) Filed: Nov. 9, 2021

(65) Prior Publication Data
US 2022/0150239 A1      May 12, 2022

(30) Foreign Application Priority Data
Nov. 10, 2020   (FR) ........................................ 2011543

(51) Int. Cl.
| | | |
|---|---|---|
| *H04L 9/40* | (2022.01) | |
| *H04L 9/08* | (2006.01) | |
| *H04L 9/32* | (2006.01) | |
| *H04L 67/55* | (2022.01) | |

(52) U.S. Cl.
CPC ........ *H04L 63/0838* (2013.01); *H04L 9/0866* (2013.01); *H04L 9/3247* (2013.01); *H04L 63/10* (2013.01); *H04L 67/55* (2022.05); *H04L 2463/061* (2013.01); *H04L 2463/062* (2013.01)

(58) Field of Classification Search
CPC . H04L 63/0838; H04L 9/0866; H04L 9/3247; H04L 2463/061; H04L 2463/062; H04L 63/10; H04L 67/55; H04L 2463/082
See application file for complete search history.

(56) References Cited

U.S. PATENT DOCUMENTS

| | | | |
|---|---|---|---|
| 9,002,750 B1 | 4/2015 | Chu et al. | |
| 2011/0197266 A1 | 8/2011 | Chu et al. | |
| 2017/0126408 A1* | 5/2017 | Van Someren | ......... H04L 63/06 |
| 2017/0279795 A1 | 9/2017 | Redberg | |
| 2019/0166112 A1* | 5/2019 | Gordon | ................. H04L 63/083 |
| 2022/0198056 A1* | 6/2022 | Nigro | .................... H04L 51/216 |

OTHER PUBLICATIONS

"European Application Serial No. 21207058.5, Extended European Search Report mailed Mar. 14, 2022", 14 pgs.

(Continued)

*Primary Examiner* — Shirley X Zhang
(74) *Attorney, Agent, or Firm* — Schwegman Lundberg & Woessner, P.A.

(57) ABSTRACT

A method of device authentication comprises receiving a password into an application of a user device; transmitting verification information of the password from the application to an authentication device; verifying, by the authentication device, validity of the password using the verification information; granting, by the authentication device, access by the user device to a secure resource when the password is valid; sending no indication of an invalid password to the user device when the authentication device determines the password is invalid; and blocking access of the user device to the secure resource when a predetermined number of passwords are determined to be invalid by the authentication device.

14 Claims, 7 Drawing Sheets

(56) References Cited

OTHER PUBLICATIONS

"European Application Serial No. 21207058.5, Response filed Nov. 3, 2022 to Extended European Search Report mailed Mar. 14, 2022", 12 pgs.
"European Application Serial No. 21207058.5, Communication Pursuant to Article 94(3) EPC mailed Nov. 30, 2023", 8 pgs.
"European Application Serial No. 21207058.5, Response filed Mar. 21, 2024 to Communication Pursuant to Article 94(3) EPC mailed Nov. 30, 2023", 16 pgs.

\* cited by examiner

MITIGATION OF BRUTE FORCE ATTACK TO DEVICE PIN

PRIORITY APPLICATION

This application claims priority to French Provisional Patent Application Number 2011543, filed Nov. 10, 2020, the disclosure of which is incorporated herein in its entirety by reference.

TECHNICAL FIELD

Embodiments illustrated and described herein generally relate to identity authentication systems that authenticate users for access to secure resources.

BACKGROUND

There are many applications for which quick and accurate authentication of identity of a device of a user is desirable when the device is being used to access a secured resource. Some examples include remote identity authentication for applications such as mobile online shopping or mobile banking. Additional examples include airline travel and secure access to controlled areas. Device authentication can involve a user entering user sending authentication information using a credential device such as a smartphone or personal computer (PC), and the information being automatically verified by another device to grant access to the resource. Unfortunately, attacks to defeat systems that provide secure authentication occur often.

DETAILED DESCRIPTION

It is desired for remote identity authentication using devices to be fast and secure. Device-based authentication can include a user entering a personal identification number (PIN) or password into an application of the device to prove identity. The application then sends one or both of a One Time Password (OTP) and a signed data transaction to the secure resource. The application can be an application running on a mobile device (e.g., an Android or iOS application) or a PC (e.g., an application for Windows, macOS, Linux, etc.).

One type of malicious attack to fake a user's identity is a brute force attack or oracle attack on the PIN or password. In an oracle attack, the user's device acts as an "oracle" that gives the attacker a go or no-go indication to tell the attacker that he or she has reached or is nearing their goal of gaining access. The attacker combines the feedback from the device with a systematic search of the problem space (i.e., guessing the PIN or password) to complete the attack and gain access to the secured resource.

To provide security against malicious attacks to access the secure resource, the access by PIN or password is subject to a lock mechanism local to the user's device. In the lock mechanism, a counter is incremented for each wrong PIN or password attempt. The counter is reset to zero when the correct PIN or password is entered. If the counter reaches a predetermined allowed number of bad attempts (e.g., 5 attempts), the application is locked and prevented from accepting any further attempts of entering the PIN or password. This works well unless the attacker is able to hack and manipulate the counter, such as by restoring the device database to an older state where the counter is not yet at the lockout limit or bypassing the incrementing of the counter or the check on the counter value.

Figure 1:
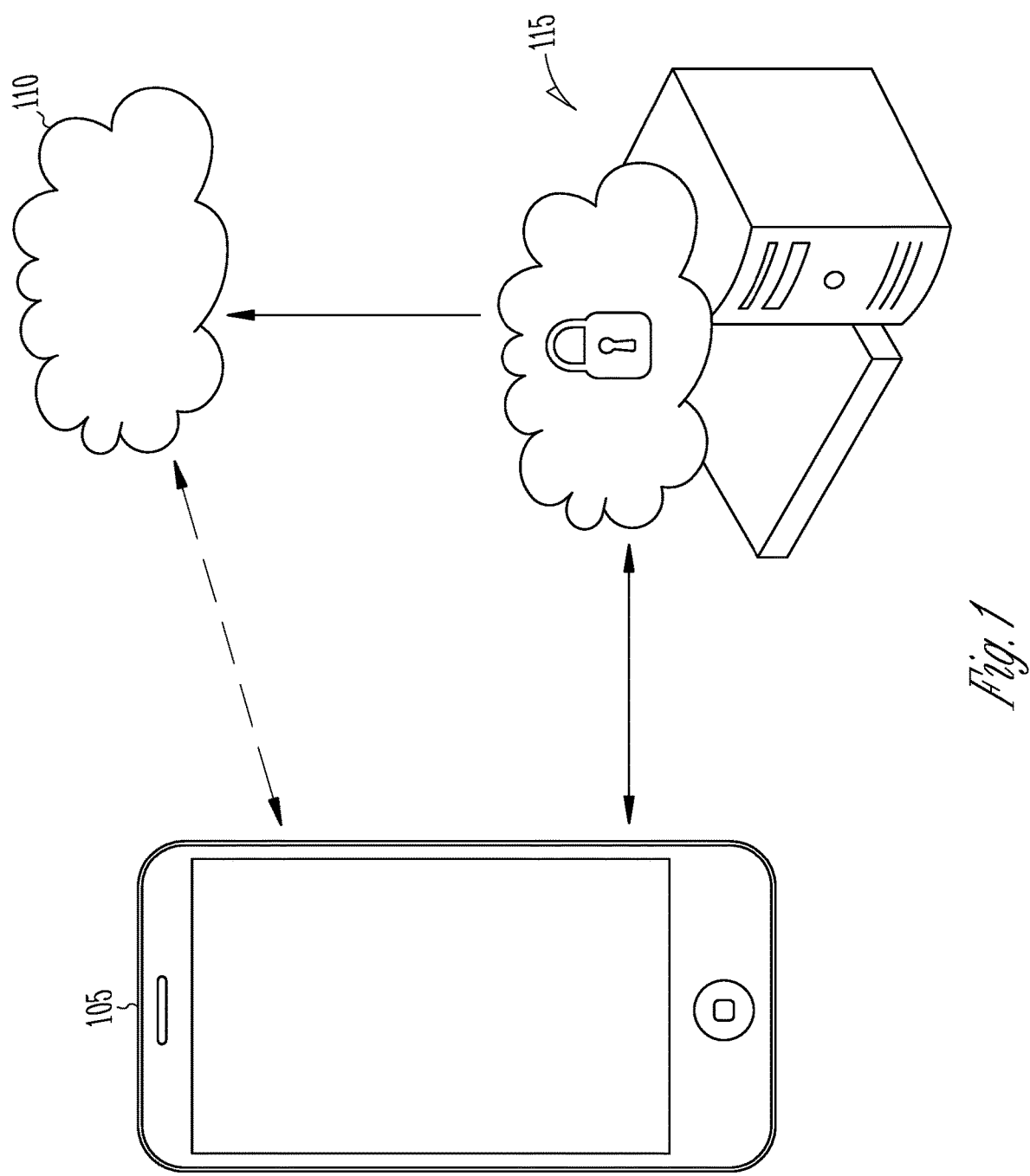
FIG. 1 is a diagram of an example of portions of a system for authenticating a user device.

FIG. 1 is a diagram of an example of portions of a system for authenticating a user. The user enters a PIN or password into an application executing on the mobile device 105 to access a secure resource via a network 110 such as the Internet or a cellular network. The access may be to any suitable secure resource, such as, for example, transaction access to a financial account of the user, physical access through a controlled physical portal (e.g., doorway) to a secured area, or any other type of logical or physical access to a secure asset. As explained previously herein, a conventional approach is for the application to generate an OTP or a signed data transaction in response to a correct PIN or password, and to send the OTP or signed data transaction to the secure resource as proof of identity.

To mitigate a brute force attack on the PIN or password, the application does not verify the PIN or password. Instead, a PIN or password generated OTP is redirected to an Authentication Server 115 (or other authentication endpoint device) which implements the PIN or password attempt lock mechanism. The OTP will be correct only if the PIN or password entered was correct. The only way to know if the generated OTP is valid (and consequently whether the PIN or password was correct) is to verify the OTP against the Authentication Server 115. The application of the mobile device does not verify the PIN or password and does not provide feedback on whether the PIN or password entered is incorrect. Thus, a hacker has no way to know if the PIN or password entered was the right one or not. The Authentication Server 115 implements the lock mechanism or policy and can automatically lock the user account after multiple tries of an incorrect PIN or password. As a consequence, brute force attacks are not possible, and even if the hacker debugs or manipulates the application code, the hacker cannot find the right PIN or password or bypass its verification because the verification is not performed by the application.

Figure 2:
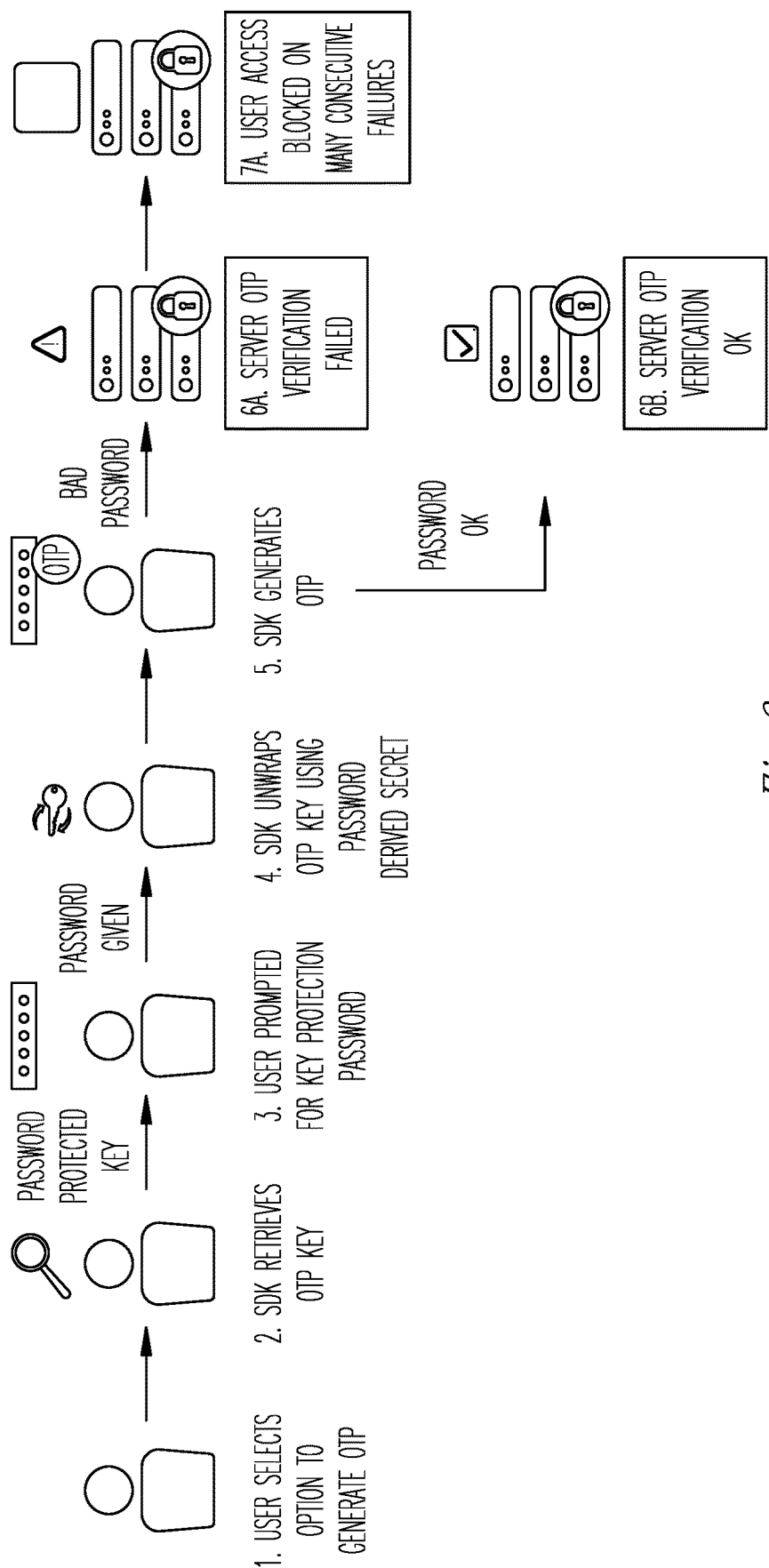
FIG. 2 is a flow diagram of an example of a method of authentication of a user device.

FIG. 2 is a flow diagram of an example of a method of authentication of a user device, such as a mobile phone, smartphone, computer, laptop computer, tablet computer, or other device that can function as a credential device. The authentication may be for the user to access a secure resource. The access may be, for example, physical access to a secure area or logical access to a user account, such as a bank account or credit account. The keys used in the authentication may be symmetric keys, such as symmetric keys determined according to an advanced encryption standard (AES) symmetric algorithm, or any other symmetric or message authentication code (MAC) cryptographic algorithm. At step 1, the user selects the option to generate an OTP for a secure transaction with the user device. At step 2, the application (SDK) retrieves an OTP master key in response to the selection. The OTP master key has been stored in secure storage of the user device, and the master key is wrapped (encrypted) using a secret derived from the valid password. At step 3, the user device prompts the user to enter the key protection password. At step 4, the application unwraps the OTP master key using a secret derived from the key protection password entered by the user.

At step 5, the application generates the OTP using the unwrapped OTP master key and sends the OTP to the Authentication Server. If the password entered at step 3 is correct, the Authentication Server verifies a valid OTP at step 6b. The user's device is authenticated, and the user is granted the access requested. If the entered password is incorrect, unwrapping the OTP master key will be incorrect, yielding an incorrect master key. Hence the OTP will be invalid, and at step 6a the validation of the OTP by the Authentication Server fails. The invalid OTP sent has the same format as a valid OTP to help avoid detection of an invalid key by the attacker. If someone is improperly trying to access the protected resource (i.e., an attacker or hacker) through a brute force attack, steps 3-6 would be repeated, likely several times. At step 7a, after a predetermined number of consecutive failures, the user access to the secure resource is blocked. No feedback need be returned to the application disclosing the failures in validation. If the invalid passwords were entered as part of a brute force attack, the attack will be stopped by the lock out mechanism of the authentication server and the attack will fail.

Figure 3:
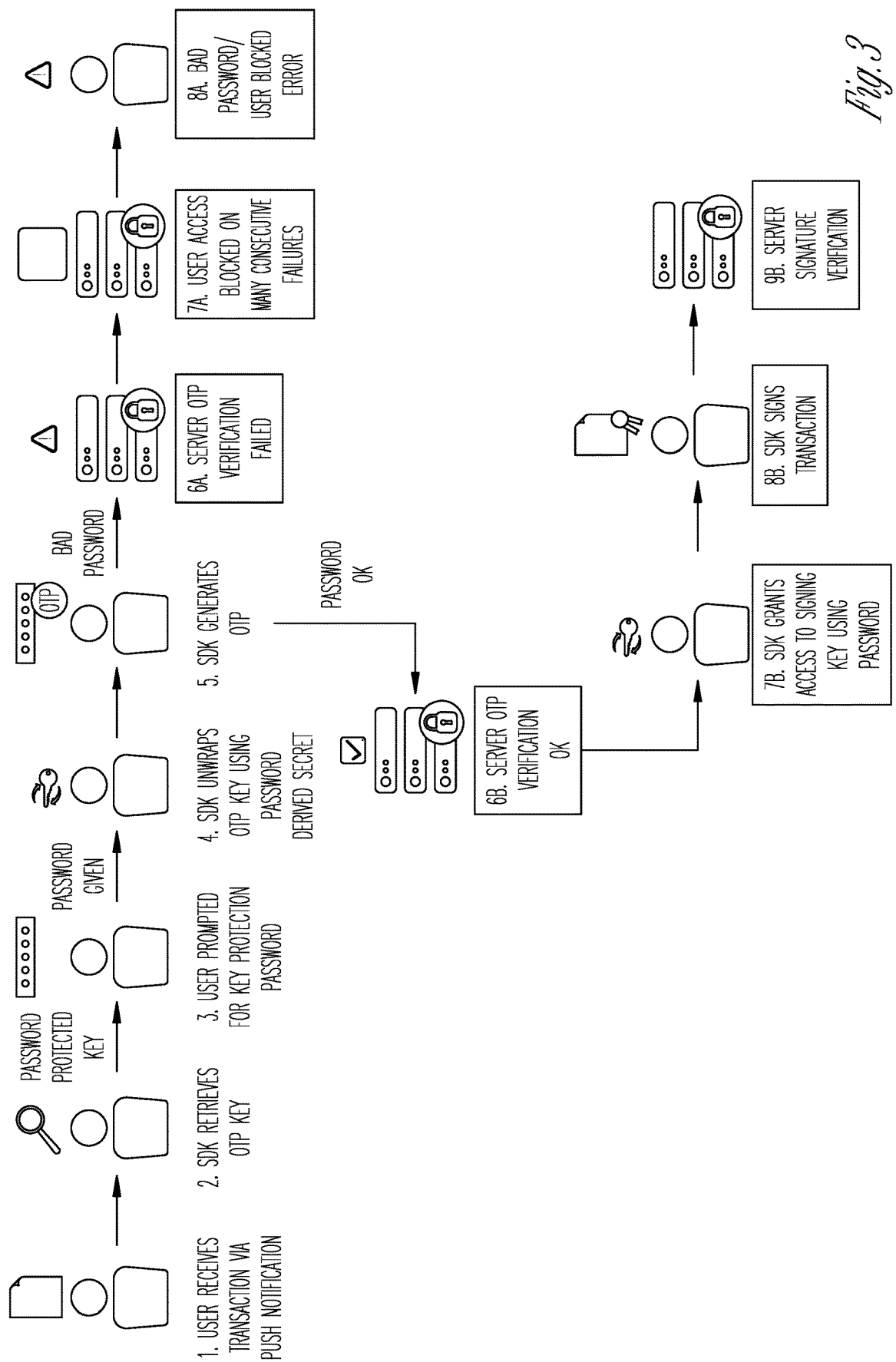
FIGS. 3-5 are flow diagrams of further examples of a method of authentication of a user device.

FIG. 3 is a flow diagram of another example of a method of authentication of a user device. The authentication is in response to push notification that is a request for signature of a data transaction. For signature of a data transaction, the situation is more complicated because the application needs to access a signature key and sign the transaction when the password is valid. The mitigation solution is to forbid access to the signature private key in a way that is not prone to brute force attacks.

The keys used in the authentication may be RSA asymmetric keys or may be keys determined according to another asymmetric algorithm. In some examples, the keys are determined according to a symmetric algorithm that has a structure susceptible to a brute force attack. At step 1, the application of the user device receives the push notification for the transaction. At step 2, the application retrieves an OTP master key in response to the push notification. As in the example of FIG. 2, the OTP master key is stored in secure storage of the user device, and the OTP master key is wrapped using a secret derived from the valid password. At step 3, the user device prompts the user to enter the key protection password. At step 4, the application unwraps the OTP master key using a secret derived from the key protection password entered by the user, and at step 5, the application generates the OTP using the OTP master key and sends the OTP to the Authentication Server.

If the password entered at step 3 is correct, the Authentication Server verifies a valid OTP at step 6b. The user's device is authenticated, and the Authentication Server may send notice of a valid password to the application. At step 7b, the application grants access to the signing key according to the valid password. At step 8b, the application signs the transaction and the signed transaction is sent to the Authentication Server or a different server for signature verification at step 9b.

If the password entered at step 3 is incorrect, at step 6a, the Authentication Server's validation of the OTP fails. At step 7a, after a predetermined number of consecutive failures (e.g., repetition of steps 3-6a), the user access to the account on the server is blocked. At step 8a, a user blocked error may be sent to the user's device. Note that no feedback is returned to the application disclosing the failures in validation at step 7a. If the invalid passwords were entered as part of a brute force attack, the attack will result in a lock out by the authentication server and the attack will fail.

Figure 4:
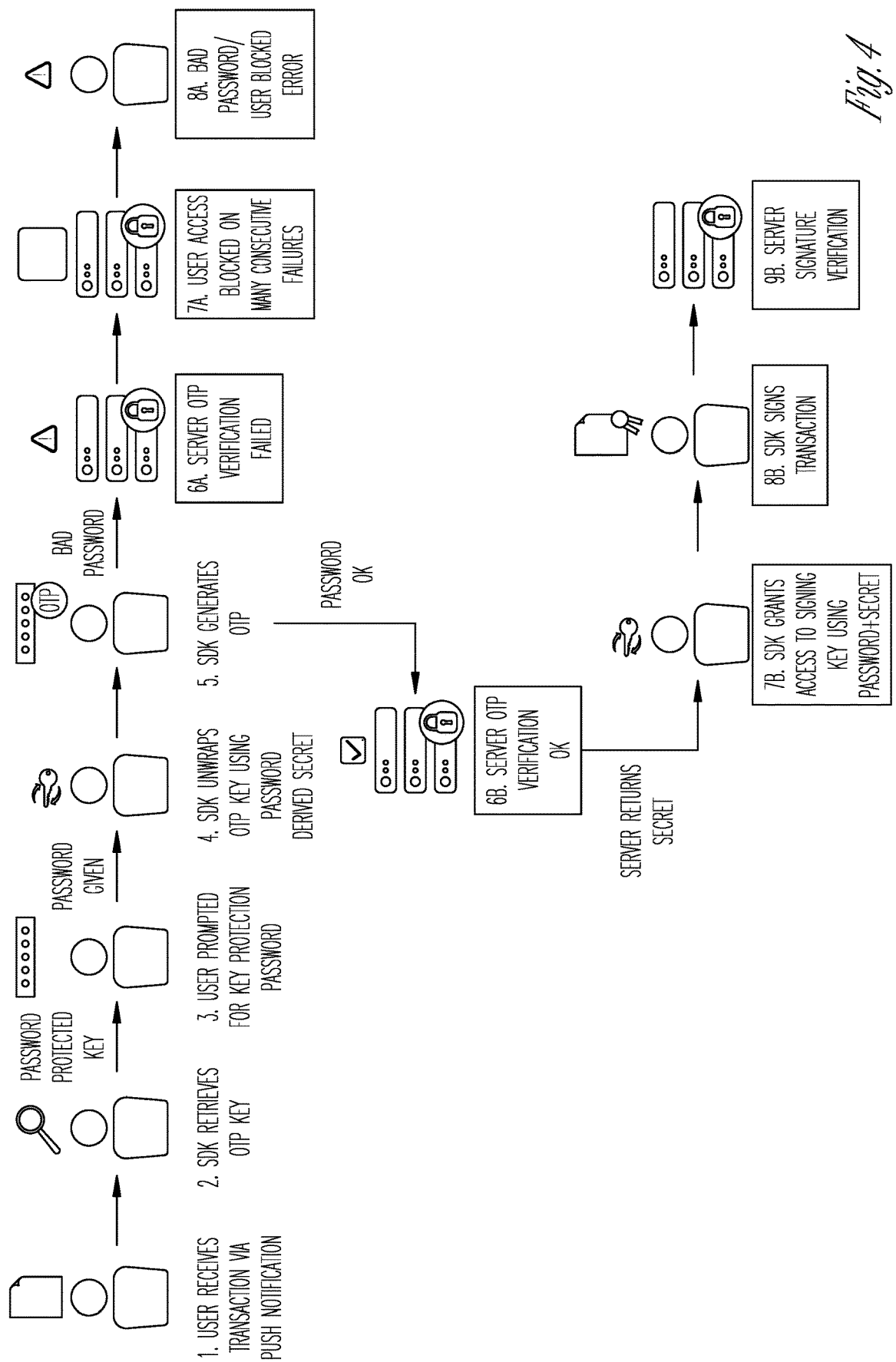

FIG. 4 is a flow diagram of another example of a method of authentication of a user device. The method is similar to the example method of FIG. 3, and so for conciseness, steps 1-4 are not described again here. At step 5, the application generates the OTP using the OTP master key and sends the OTP to the Authentication Server for validation. If the password entered at step 3 is incorrect, at step 6a, the Authentication Server's validation of the OTP fails. At step 7a, after a predetermined number of consecutive failures (e.g., repetition of steps 3-6a), the user access to the account on the server is blocked. No feedback is returned to the application disclosing the failures in validation at step 7a. If the invalid passwords were entered as part of a brute force attack, the lock out mechanism of the authentication server will cause the attack to fail. The difference from FIG. 3 is that when the Authentication Server verifies a valid OTP at step 6b, the Authentication Server produces a server secret and returns the secret to the user's device. The server secret may be generated using the valid OTP. At step 7b, the application of the user's device grants access to the signing key according to the valid password and the received secret. In some examples, the application uses the valid password and secret to determine an access key used to access the signing key. It should be noted that the use of the password is preserved by the application to provide a non-repudiation property of the algorithm. The authentication server is unable to sign on behalf of the client with the knowledge of the server secret only, and the user password is needed to allow the signature. At step 8b, the application signs the transaction and the signed transaction is sent to the Authentication Server or a different server for signature verification at step 9b.

If the application is run in a device that supports a Trusted Execution Environment (TEE), the private key should run in the TEE and access to the private key should be protected with a strong key that depends on the combination of one or both of a PIN and password with a server secret. If there is no TEE, the private key should be encrypted with an AES key depending on the combination of PIN, password, and server secret.

Although the authentication example in FIG. 4 is quite robust, the security of the authentication operation can be improved by changing the secret sent by the server. If the attacker is able to spy on the network exchanges occurring while the device is used by the legitimate user, the attacker could sniff the returned Server Secret to reuse it.

To change the Server Secret, the authentication server may return n secrets on each successful OTP verification (i.e., ServerSecret1, ServerSecret2 ... ServerSecretn, where n is positive integer greater than 2). ServerSecret1 is the current active secret value, ServerSecret2 is the previous secret value that was active just before the server decided to switch to a new value, and so on for a list of previously active ServerSecrets. The frequency with which the Server Secret is switched is driven by a server security policy. For example, the secret may be changed after every X successful OTP verifications, after a random number (in a given range) of successful OTP verifications, after each OTP verification failure, at chosen time intervals, etc., according to the policy.

When the user device receives the ServerSecrets, it first tries using ServerSecret1 to compute the RSA private key access key in combination with the PIN/Password, as described in the original algorithm. If the access works, using ServerSecret1, the process is done. (It should be noted that although is described using an RSA private key access protection, the concept can be applied to any Asymmetric cryptography operation).

If the access does not work, the user device tries the same operation with ServerSecret2 . . . ServerSecretn, until one of the secrets works. In this case it means that the authentication server has changed its secret and that the user device should change the secret as well. The user device will access the RSA key with the ServerSecret value that worked and the PIN/Password, perform the required Asymmetric cryptographic operation and then will change the RSA private key protection to an access key now based on ServerSecret1. This way the device is now in sync with the server for what concerns the Server Secret. By the authentication server returning the n last server secrets the synchronization will work even if there are some network transmission errors, or if the user aborts an operation (it should be noted that the server secret is never kept on the device, it is securely erased just after use).

The number n of ServerSecrets may depend on the switch frequency, but for most security policies n=2 is enough. The authentication server will just return ServerSecret1 and ServerSecret2 and if something went wrong it will return the same sequence on a subsequent call, allowing the device to get back in sync even if some secret returns were missed.

The security policy can be made stricter, by requiring a change to the secret after each successful OTP verification. In this case the number n of returned secrets should be greater than just the last two Server Secrets (e.g., the last 5 Server Secret). If there is a network error or if the user aborts the operation after submitting a good OTP, the server will recompute a new Server Secret but the client device did not receive it and did not resynchronize. If such error occurs more than one time in a row, the server will be ahead of the user device for many new Server Secrets. If the last 5 Server Secrets are transmitted, the protocol is robust again after 5 successive failures, which is a robust solution.

Figure 5:
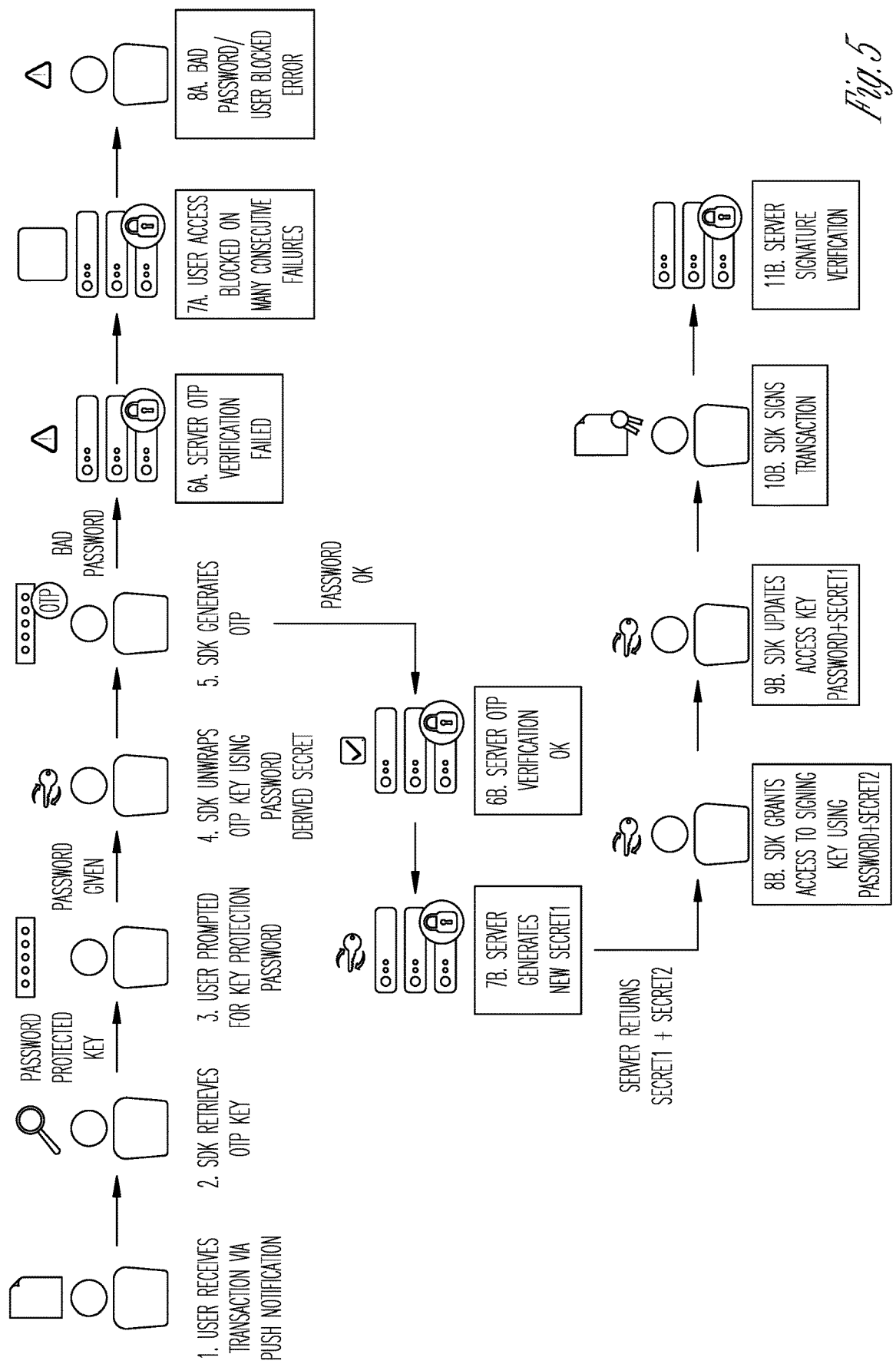

FIG. 5 is a flow diagram of another example of a method of authentication of a user device. The method is also similar to the example method of FIG. 3, and so for conciseness, steps 1-4 are not described again here. At step 5, the application generates the OTP using the OTP master key and sends the OTP to the Authentication Server for validation. If the password entered at step 3 is incorrect, at step 6a, the Authentication Server's validation of the OTP fails. At step 7a, after a predetermined number of consecutive failures (e.g., repetition of steps 3-6a), the user access to the account on the server is blocked. No feedback is returned to the application disclosing the failures in validation at step 7a, and if the invalid passwords were entered as part of a brute force attack, the lock out mechanism of the authentication server causes the attack to fail.

The difference from the example of FIG. 3 is that in FIG. 5 when the Authentication Server verifies a valid OTP at step 6b, the Authentication Server produces two new secrets, Secret 1 and Secret 2, and returns the secrets to the application of the user device at step 7b. At step 8b, the application grants access to the signing key according to the valid user password and a received secret (e.g., Secret 2). The application may determine an access key to access the signing key using the password and received secret. At step 9b, the application updates the access key using the password and the received secret that worked. At step 10b, the application signs the transaction and the signed transaction is sent to the Authentication Server or a different server for signature verification at step 11b.

Figure 6:
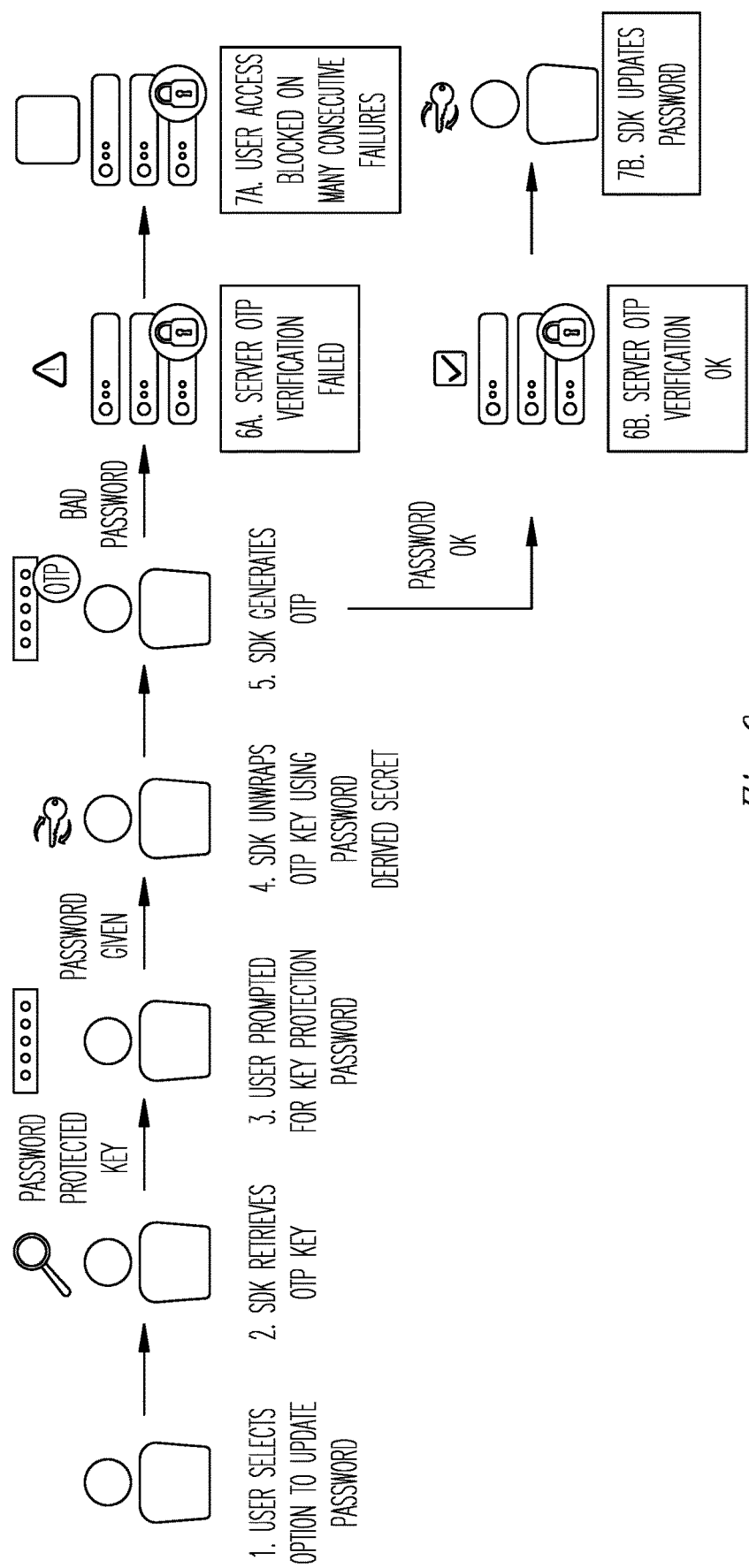
FIG. 6 is a flow diagram of an example updating a key protection password.

FIG. 6 is a flow diagram of an example of using a lock policy to mitigate brute force attacks when updating the key protection password. At step 1, the user selects the option to update the key protection password of the application. The selection may be made in response to a prompt from the application. At step 2, the application retrieves the OTP master key in response to the selection. As in the example of FIG. 2, the OTP master key is stored in secure storage of the user device, and the OTP master key is wrapped using a secret derived from the valid password. At step 3, the application prompts the user to enter the current key protection password. At step 4, the application unwraps the OTP master key using a secret derived from the key protection password entered by the user. At step 5, the application generates the OTP using the unwrapped OTP master key and sends the OTP to the Authentication Server.

If the password entered at step 3 is correct, the Authentication Server verifies a valid OTP at step 6b. The user's device is authenticated, and the application updates the key protection password at step 7b. If the password entered at step 3 is incorrect, unwrapping the OTP master key will be incorrect, the OTP will be invalid, and at step 6a the Authentication Server's validation of the OTP fails. At step 7a, after a predetermined number of consecutive failures (e.g., repetition of steps 3-6a), the user access to the account on the server is blocked. No feedback may be returned to the application disclosing the failures in validation. If the invalid passwords were entered as part of a brute force attack, the lock out mechanism of the authentication server causes the attack to fail.

The systems, devices, and methods described herein provide a silent lock policy to mitigate a brute force attack on the PIN or password of the user device. Any notices of password authentication errors are suppressed, and cryptographic operation will be silently carried out with a false key or false OTP. Such "silent" lock policy enables validation and blocking to be delegated to server-side controls (such as exhausting the failed authentication counter), thus allowing any attempts to be audited and validated by the server and preventing negative password validation results from being easily identified by the attacker.

The silent lock policy may have symmetric cryptography that allows to replace the local PIN/Password verification with a remote OTP verification on a server. This verification method can be applied to other services such as an RSA Signature, and can be used for other functionalities, such as changing a PIN/Password.

Changing a PIN/Password requires to enter the old PIN/Password and then to enter and confirm the new one. In the silent lock policy this is challenging because the PIN/Password verification functionality is removed from the device. A way to handle the change PIN/password functionality is to replace the local PIN/password verification by the remote OTP verification. An example of a process flow to change a PIN/password with remote verification includes:

i) Prompt the user with the user's device to enter the old PIN/Password and the new PIN/Password.
ii) Use the old PIN/Password to decrypt the symmetric key (e.g., an open authentication key, or OATH key.
iii) Use the resulting key to compute a OTP (e.g., an OATH time-based one time password, or OATH TOTP).
iv) Send the OTP to the server for verification.
v) If the OTP is verified successfully, the server returns the Server Secret. If the OTP is not verified successfully, the server returns an error and increments the lock counter, including locking the account if the counter reaches a predetermined counter value.

vi) Only if the OTP was verified successfully does the device use the Server Secret to gain access to other keys or access methods that depend on the PIN/Password value and updates their encryption or access key according to the new PIN/Password.

The silent lock policy with remote OTP verification on a server uses a network connection with the server to verify the OTP and get back the Server Secret. However, the OTP generation step also can work offline without a network connection, and may be used in hardware devices that use tokens (e.g., Flexitokens, Token Ones, etc.) that are used to generate OTPs or to sign data using symmetric cryptography (e.g., OATH Challenge-Response Algorithms or OCRAs). Brute force attacks on the PIN/password of the offline hardware devices is not possible. This may be an advantage in certain circumstances, such as if the device owner is under duress for example.

Figure 7:
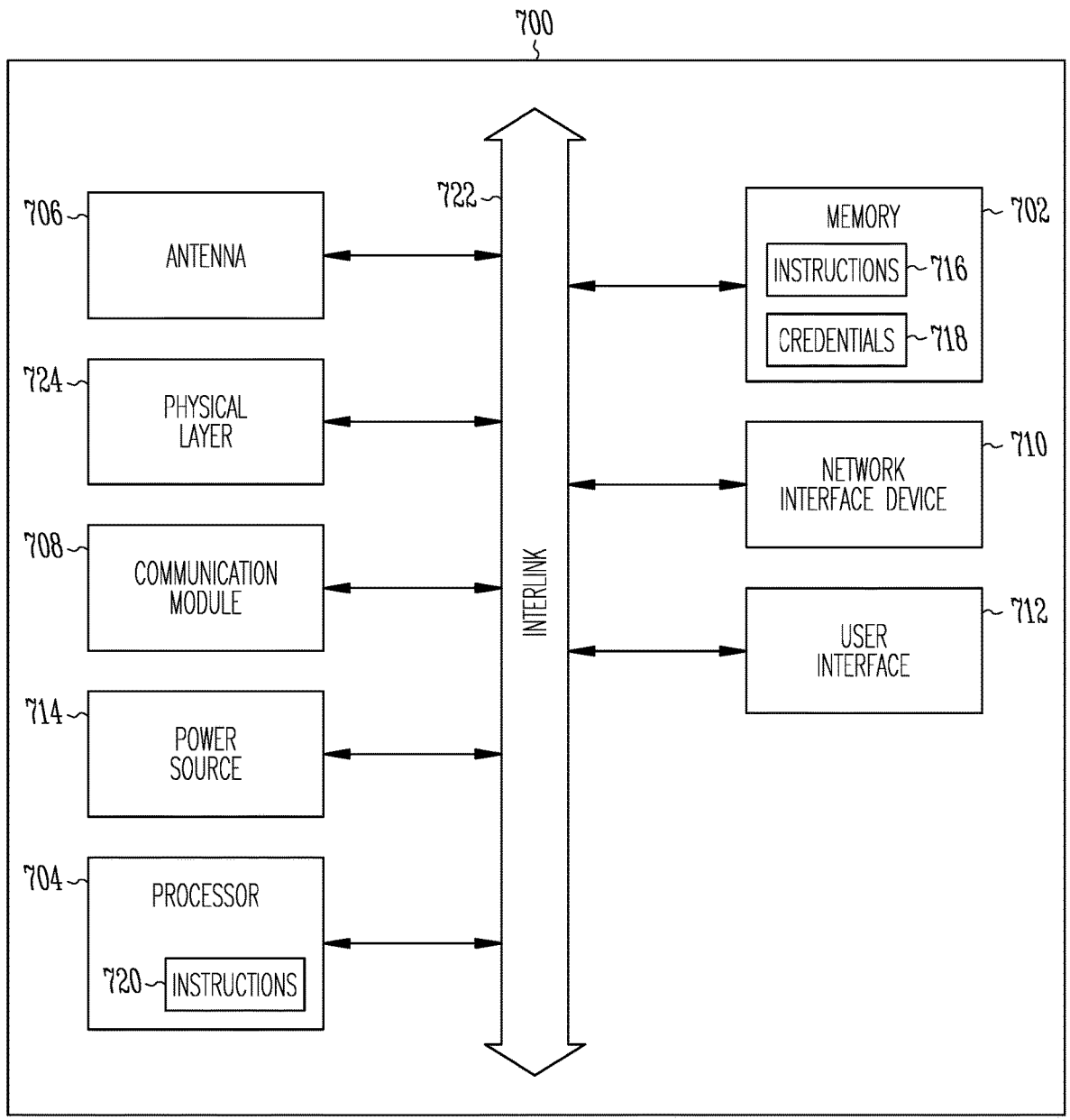
FIG. 7 is a block diagram schematic of various example components of a device.

FIG. 7 is a block diagram schematic of various example components of a device 700 for supporting the system architectures described and illustrated herein. The device 700 of FIG. 7 could be, for example, a server that authenticates credential information of authority, status, rights, and/or entitlement to privileges for the holder of a credential device, or a user device to provide the credential information. At a basic level, the device can include an interface (e.g., one or more antennas and Integrated Circuit (IC) chip(s)), which permits the device to exchange data with another device, such as a credential device or another verifier device. One example of credential device is a mobile device that has data stored thereon allowing a holder of the credential device to access a secure area or asset protected by the device.

With reference specifically to FIG. 7, additional examples of a device 700 for supporting the device architecture described and illustrated herein may generally include one or more of a memory 702, a processor 704, one or more antennas 706, a communication port or communication module 708, a network interface device 710, a user interface 712, and a power source 714 or power supply.

Memory 702 can be used in connection with the execution of application programming or instructions by processing circuitry, and for the temporary or long-term storage of program instructions or instruction sets 716 and/or authorization data 718, such as credential data, credential authorization data, or access control data or instructions, as well as any data, data structures, and/or computer-executable instructions needed or desired to support the above-described device architecture. For example, memory 702 can contain executable instructions 716 that are used by a processor 704 of the processing circuitry to run other components of device 700, to perform any of the functions or operations described herein, such as any of the methods of FIGS. 2-6 for example, and make access determinations based on authorization data 718 (e.g., one or both of passwords and keys). Memory 702 can comprise a computer readable medium that can be any medium that can contain, store, communicate, or transport data, program code, or instructions for use by or in connection with device 700. The computer readable medium can be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), Dynamic RAM (DRAM), any solid-state storage device, in general, a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

Processor 704 can correspond to one or more computer processing devices or resources. For instance, processor 704 can be provided as silicon, as a Field Programmable Gate Array (FPGA), an Application-Specific Integrated Circuit (ASIC), any other type of Integrated Circuit (IC) chip, a collection of IC chips, or the like. As a more specific example, processor 504 can be provided as a microprocessor, Central Processing Unit (CPU), or plurality of microprocessors or CPUs that are configured to execute instructions sets stored in an internal memory 720 and/or memory 702.

Antenna 706 can correspond to one or multiple antennas and can be configured to provide for wireless communications between device 700 and another device. Antenna(s) 706 can be coupled to one or more physical (PHY) layers 724 to operate using one or more wireless communication protocols and operating frequencies including, but not limited to, the IEEE 802.15.1, Bluetooth, Bluetooth Low Energy (BLE), near field communications (NFC), ZigBee, GSM, CDMA, Wi-Fi, RF, UWB, and the like. In an example, antenna 706 may include one or more antennas coupled to one or more physical layers 724 to operate using ultra-wide band (UWB) for in band activity/communication and Bluetooth (e.g., BLE) for out-of-band (OOB) activity/communication. However, any RFID or personal area network (PAN) technologies, such as the IEEE 502.15.1, near field communications (NFC), ZigBee, GSM, CDMA, Wi-Fi, etc., may alternatively or additionally be used for the OOB activity/communication described herein.

Device 700 may additionally include a communication module 708 and/or network interface device 710. Communication module 708 can be configured to communicate according to any suitable communications protocol with one or more different systems or devices either remote or local to device 700. Network interface device 710 includes hardware to facilitate communications with other devices over a communication network utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, wireless data networks (e.g., IEEE 802.11 family of standards known as Wi-Fi, IEEE 802.16 family of standards known as WiMax), IEEE 802.15.4 family of standards, and peer-to-peer (P2P) networks, among others. In some examples, network interface device 710 can include an Ethernet port or other physical jack, a Wi-Fi card, a Network Interface Card (NIC), a cellular interface (e.g., antenna, filters, and associated circuitry), or the like. In some examples, network interface device 710 can include a plurality of antennas to wirelessly communicate using at least one of single-input multiple-output (SIMO), multiple-input multiple-output (MIMO), or multiple-input single-output (MISO) techniques. In some example embodiments, one or more of the antenna 706, communication module 708, and/or network interface device 710 or subcomponents thereof, may be integrated as a single module or device, function or operate as if they were a single module or device, or may comprise of elements that are shared between them.

User interface 712 can include one or more input devices and/or display devices. Examples of suitable user input devices that can be included in user interface 712 include, without limitation, one or more buttons, a keyboard, a mouse, a touch-sensitive surface, a stylus, a camera, a microphone, etc. Examples of suitable user output devices that can be included in user interface 712 include, without limitation, one or more LEDs, an LCD panel, a display screen, a touchscreen, one or more lights, a speaker, etc. It should be appreciated that user interface 712 can also include a combined user input and user output device, such as a touch-sensitive display or the like.

Power source 714 can be any suitable internal power source, such as a battery, capacitive power source or similar type of charge-storage device, etc., and/or can include one or more power conversion circuits suitable to convert external power into suitable power (e.g., conversion of externally-supplied AC power into DC power) for components of the device 700.

Device 700 can also include one or more interlinks or buses 722 operable to transmit communications between the various hardware components of the device. A system bus 722 can be any of several types of commercially available bus structures or bus architectures.

ADDITIONAL DISCLOSURE AND EXAMPLES

Example 1 includes subject matter (such as a method of device authentication) including receiving a password into an application of a user device; transmitting verification information of the password from the application to an authentication device; verifying, by the authentication device, validity of the password using the verification information; granting, by the authentication device, access by the user device to a secure resource when the password is valid; sending no indication of an invalid password to the user device when the authentication device determines the password is invalid; and blocking access of the user device to the secure resource when a predetermined number of passwords are determined to be invalid by the authentication device.

In Example 2, the subject matter of Example 1 optionally includes deriving, by the application, a one-time password (OTP) master key using the password; generating, by the application, an OTP as the verification information using the OTP master key; wherein the granting access includes granting access to the secure resource to the user device when the OTP is validated by the authentication device; and wherein the blocking access includes blocking access of the user device to the secure resource when a predetermined number of OTPs are determined to be invalid by the authentication device.

In Example 3, the subject matter of Example 2 optionally includes receiving, by the application, a command to generate the OTP for a secure transaction via a user interface of the user device; determining the OTP master key in response to the command; and presenting, by the user device, a prompt to enter the password in response to the command.

In Example 4, the subject matter of Example 2 optionally includes receiving, by the application, a push notification for a secure transaction; and presenting, by the user device, a prompt to enter the password in response to the push notification; granting, by the application, access to a signing key according to the valid password; signing, by the application, the secure transaction and sending the signed secure transaction with signature to the authentication device; and granting, by the authentication device, access to the secure resource when determining the signature is valid.

In Example 5, the subject matter of Example 4 optionally includes sending, by the authentication device, a secret generated using a valid OTP to the application; and granting the access to the signing key according to the secret and the password.

In Example 6, the subject matter of Example 4 optionally includes sending, by the authentication device, a first secret and a second secret to the application in response to receiving the valid OTP; granting the access to the signing key according to one of the secrets and the password; and updating, by the application, an access key according to the password and the secret that provided the access.

In Example 7, the subject matter of one or any combination of Example 2 optionally includes receiving, by the application via a user interface of the user device, a command to update a current password; presenting, by the user device, a prompt to enter the current password in response to the command; determining the OTP master key in response to the command; and updating the password when the OTP is validated by the authentication device.

In Example 8, the subject matter of one or nay combination of Examples 1-7 optionally includes granting access to a secure resource that is remote from both the user device and the authentication device.

In Example 9, the subject matter of one or any combination of Examples 1-8 optionally includes granting access to a physical portal.

Example 10 includes subject matter (such as an authentication device) or can optionally be combined with one or any combination of Examples 1-9 to include such subject matter, including physical layer circuitry; processing circuitry operatively coupled to the physical layer circuitry and configured to receive a one-time password (OTP) from a user device, the OTP generated by the user device using a user password; verify validity of the OTP; grant access by the user device to a secure resource when the OTP is valid; send no indication of an invalid password to the user device when the OTP is invalid; and block access of the user device to the secure resource when a predetermined number of OTPs are determined to be invalid.

In Example 11, the subject matter of Example 10 optionally includes processing circuitry configured to send a push notification for a secure transaction to the user device; receive the OTP from the user device in response to the push notification; send a notification to the user device when the OTP is valid; receive a signed secure transaction with signature from the user device; and grant the access to the secure resource when determining the signature is valid.

In Example 12, the subject matter of Example 11 optionally includes processing circuitry configured to send a secret to the user device generated using the valid OTP, wherein the secret is usable to access a signing key by the user device.

In Example 13, the subject matter of one or both of examples 11 and 12 optionally includes processing circuitry configured to send multiple secrets to the user device in response to receiving the valid OTP, wherein one of the secrets is usable to access a signing.

In Example 14, the subject matter of one or any combination of Examples 10-13 optionally includes processing circuitry configured to update the user password when the OTP is validated by the authentication device.

Example 15 includes subject matter, or can optionally be combined with one or any combination of Examples 1-14 to include such subject matter, such as a computer-readable storage medium including instructions that, when executed by processing circuitry of a user device of an authentication system, cause the user device to perform acts including determining a one-time password (OTP) master key using a user password received via a user interface of the user device; generating an OTP using the OTP master key; sending the OTP to an authentication server; and decoding an indication of one of allowed access or blocked access to a secure resource separate from the authentication server in response to sending the OTP.

In Example 16, the subject matter of Example 15 optionally includes instructions that cause the user device to perform acts including receiving a command via the user interface to generate the OTP for a secure transaction using the user device; and presenting a prompt using the user interface to enter the password in response to the receiving the command.

In Example 17, the subject matter of one or both of Examples 15 and 16 optionally includes instructions that cause the user device to perform acts including receiving a push notification for a secure transaction using the user device; presenting a prompt using the user interface to enter the password in response to the push notification; accessing a signing key in response to sending the OTP; signing the secure transaction and sending the signed secure transaction to the authentication device; and receiving the indication of access to the secure resource in response to sending the signed secure transaction.

In Example 18, the subject matter of Example 17 optionally includes instructions that cause the user device to perform acts including decoding a secret received from the authentication server in response to sending the OTP; and accessing the signing key using the user password and the decoded secret.

In Example 19, the subject matter of one or both of Example 17 and 18 optionally includes instructions that cause the user device to perform acts including decoding a first secret and a second secret received from the authentication server in response to sending the OTP; accessing the signing key using an access key determined using the user password and one of the secrets; and updating the access key using the user password and the secret that used to gain access to the signing key.

In Example 20, the subject matter of one or any combination of Examples 15-20 optionally includes instructions that cause the user device to perform acts including receiving a command via the user interface to update a current user password to a new user password; presenting a prompt using the user interface to enter the current password in response to the command; determining the OTP master key using the current password in response to the command; and updating the current password to the new password in response to receiving the indication of access.

These non-limiting Examples can be combined in any permutation or combination. The above detailed description includes references to the accompanying drawings, which form a part of the detailed description. The drawings show, by way of illustration, specific embodiments in which the invention can be practiced. The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, the subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

What is claimed is:

1. A method of device authentication, the method comprising:
   receiving a password into an application of a user device;
   deriving, by the application, a one-time password (OTP) master key using the password;
   generating, by the application, an OTP as verification information using the OTP master key;
   transmitting the verification information from the application to an authentication device;
   verifying, by the authentication device, validity of the password using the verification information;
   granting access to a secure resource to the user device when the OTP is validated by the authentication device; and
   blocking access of the user device to the secure resource when a predetermined number of OTPs are determined to be invalid by the authentication device.

2. The method of claim 1, wherein receiving a password into the user device includes:
   receiving, by the application, a command to generate the OTP for a secure transaction via a user interface of the user device;
   determining the OTP master key in response to the command; and
   presenting, by the user device, a prompt to enter the password in response to the command.

3. The method of claim 1,
   wherein receiving a password into the user device includes:
   receiving, by the application, a push notification for a secure transaction; and
   presenting, by the user device, a prompt to enter the password in response to the push notification; and
   wherein the granting access includes:
   granting, by the application, access to a signing key according to the valid password;
   signing, by the application, the secure transaction and sending the signed secure transaction with signature to the authentication device; and
   granting, by the authentication device, access to the secure resource when determining the signature is valid.

4. The method of claim 3, wherein the granting access to the signing key includes:
   sending, by the authentication device, a secret generated using a valid OTP to the application; and
   granting the access to the signing key according to the secret and the password.

5. The method of claim 3, wherein the granting access to the signing key includes:

sending, by the authentication device, a first secret and a second secret to the application in response to receiving the valid OTP;

granting the access to the signing key according to one of the secrets and the password; and updating, by the application, an access key according to the password and the secret that provided the access.

6. The method of claim 1, wherein receiving a password into the user device includes:

receiving, by the application via a user interface of the user device, a command to update a current password;

presenting, by the user device, a prompt to enter the current password in response to the command;

determining the OTP master key in response to the command; and updating the password when the OTP is validated by the authentication device.

7. The method of claim 1, wherein the granting access to the secure resource includes granting access to a secure resource that is remote from both the user device and the authentication device.

8. The method of claim 1, wherein the granting access to the secure resource includes granting access to a physical portal.

9. A non-transitory computer-readable storage medium including instructions that, when executed by processing circuitry of a user device of an authentication system, cause the user device to perform acts comprising:

determining a one-time password (OTP) master key using a user password received via a user interface of the user device;

generating an OTP using the OTP master key;

sending the OTP to an authentication server; and decoding an indication of one of allowed access or blocked access to a secure resource separate from the authentication server in response to sending the OTP.

10. The non-transitory computer-readable storage medium of claim 9, including instructions that cause the user device to perform acts including:

receiving a command via the user interface to generate the OTP for a secure transaction using the user device; and presenting a prompt using the user interface to enter the password in response to the receiving the command.

11. The non-transitory computer-readable storage medium of claim 9, including instructions that cause the user device to perform acts including:

receiving a push notification for a secure transaction using the user device;

presenting a prompt using the user interface to enter the password in response to the push notification;

accessing a signing key in response to sending the OTP;

signing the secure transaction and sending the signed secure transaction to the authentication device; and receiving the indication of access to the secure resource in response to sending the signed secure transaction.

12. The non-transitory computer-readable storage medium of claim 11, including instructions that cause the user device to perform acts including:

decoding a secret received from the authentication server in response to sending the OTP; and accessing the signing key using the user password and the decoded secret.

13. The non-transitory computer-readable storage medium of claim 11, including instructions that cause the user device to perform acts including:

decoding a first secret and a second secret received from the authentication server in response to sending the OTP; and accessing the signing key using an access key determined using the user password and one of the secrets; and updating the access key using the user password and the secret that used to gain access to the signing key.

14. The non-transitory computer-readable storage medium of claim 9, including instructions that cause the user device to perform acts including:

receiving a command via the user interface to update a current user password to a new user password;

presenting a prompt using the user interface to enter the current password in response to the command;

determining the OTP master key using the current password in response to the command; and updating the current password to the new password in response to receiving the indication of access.

* * * * *